United States Patent [19]

Rusboldt

[11] Patent Number: 4,500,215
[45] Date of Patent: Feb. 19, 1985

[54] ICE BEARING ASSEMBLY

[76] Inventor: Timothy C. Rusboldt, 338 Hickory St., Michigan City, Ind. 46360

[21] Appl. No.: 528,548

[22] Filed: Sep. 1, 1983

[51] Int. Cl.$^3$ ............................................. F16C 37/00
[52] U.S. Cl. ................................. 384/319; 308/1 R
[58] Field of Search ............... 384/129, 247, 280, 252, 384/313, 315, 317, 319, 320, 428, 900; 308/1 R, DIG. 8, DIG. 9, DIG. 14

[56] References Cited

U.S. PATENT DOCUMENTS

| | | | |
|---|---|---|---|
| 1,499,332 | 7/1924 | Baumann | 384/99 |
| 3,283,084 | 11/1966 | Witchey | 384/99 X |
| 3,333,907 | 8/1967 | Lamb | 384/315 |
| 3,602,556 | 8/1971 | Sendzimir | 308/1 R X |
| 3,679,272 | 7/1972 | Costa et al. | 384/99 |
| 4,023,866 | 5/1977 | Atencio | 308/1 R X |

FOREIGN PATENT DOCUMENTS 765542  9/1980  U.S.S.R. ........................... 384/319

Primary Examiner—John Petrakes
Assistant Examiner—David Werner
Attorney, Agent, or Firm—Marmaduke A. Hobbs

[57] ABSTRACT

A bearing assembly in which the bearing surface is composed of ice, and lubrication is provided by the frictional action of a shaft or other supported member against the frozen surface, which liberates a thin film of liquid. A collar, composed of a synthetic resin polymer material, such as the material sold under the trademark Teflon, is mounted on the shaft and rotates with the shaft against the liquid film on the frozen bearing surface. A chill conductor ring, composed of aluminum, surrounds the collar, forming a chamber therebetween for receiving the freezable liquid, and a refrigeration system circulates coolant through passages in the conductor ring to lower its temperature and freeze the liquid into a bearing surface.

14 Claims, 10 Drawing Figures

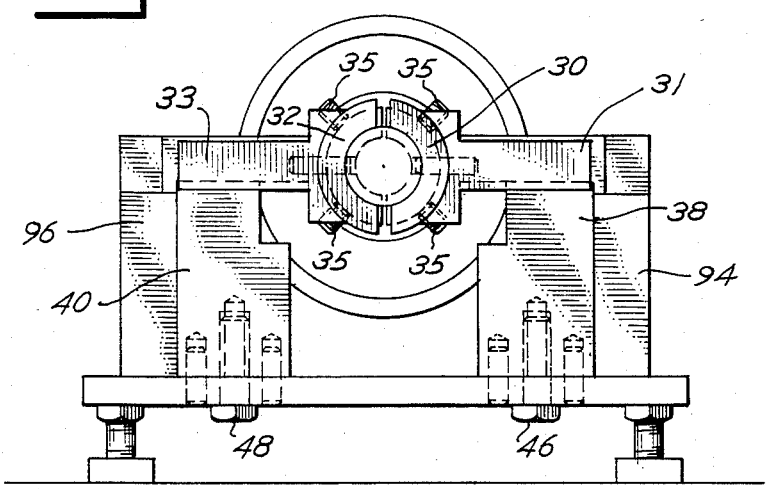
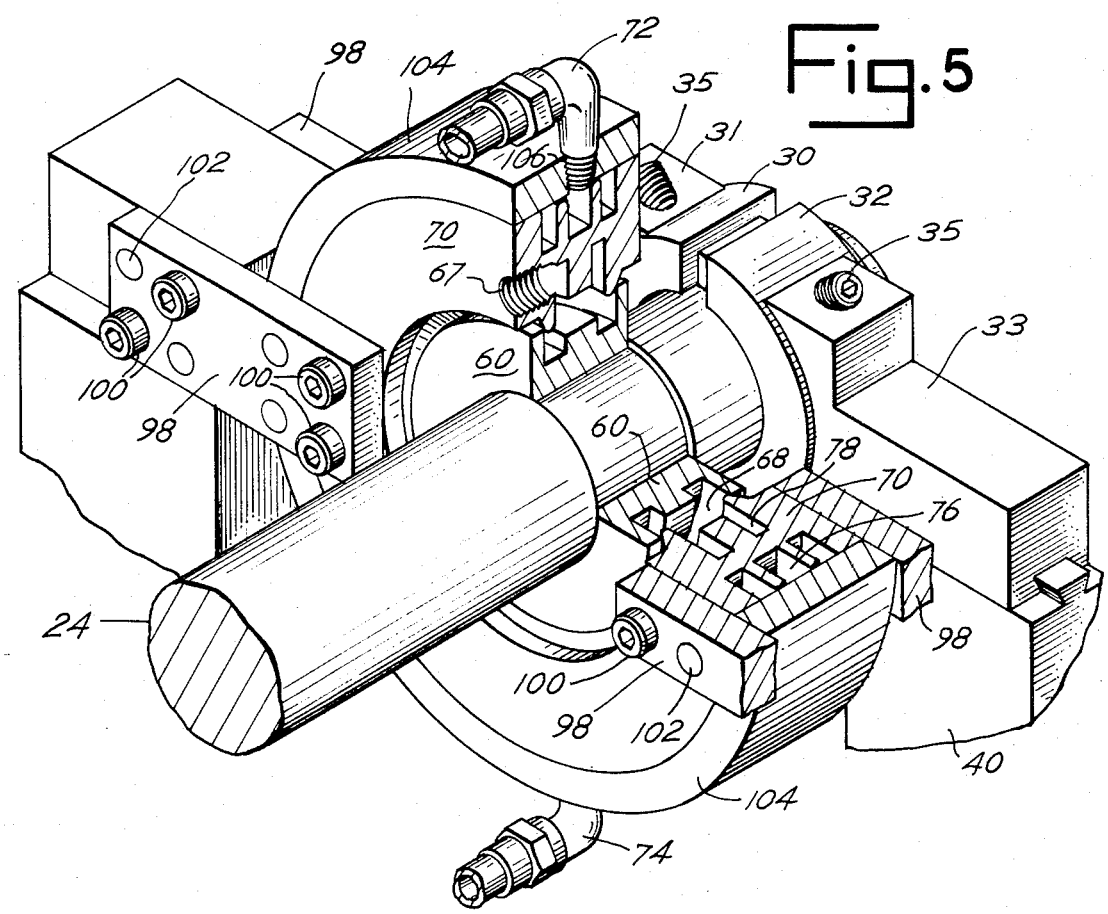

ICE BEARING ASSEMBLY

BACKGROUND OF THE INVENTION

Most machinery, or other devices which have movable parts, rely on bearings to support, align, and allow free rotational or other movement of the supported members or of the bearings themselves. Consequently, many different types of bearings, and lubrication systems for these bearings, have been developed, all endeavoring to keep maintenance and repair operations and expenses to a minimum while maximizing performance. Oil is the normal lubricant used, and the bearing surfaces and the supported members are generally composed of metal, plastic, or other material.

The bearings are essential to performance and most require regular maintenance including repair and/or replacement where necessary. Also required is regular lubrication, or permanent lubrication and sealing, due to the bearing's movement or its function of supporting movable elements. Friction must be avoided or minimized to prevent wear and subsequent failure of the bearing or of the supported member and to deliver optimum performance during operation. Maintenance operations, including repair and/or replacement of worn members, can entail substantial down time during the maintenance operation, and frequently include expensive replacement costs for the worn members since their efficient performance is necessary. Maintenance operations can be an especially troublesome problem and the costs can be greatly multiplied on those members which are internally located in the particular machinery or where the machinery itself is in a remote location. Thus, consideration must also be given to the personnel and travel costs involved and to the concomitant loss of production and time.

Special problems are also encountered with bearings that must operate in cold environments, either within the machinery itself, or in cold regions of Earth, or in outer space. Colder temperatures reduce the viscosity of the lubricant and special precautions, pre-heating assemblies, or the like, are required to assure that the lubricant is sufficiently fluid to function properly. Without such safeguards, insufficient lubricant will reach the bearing surfaces upon initiation of movement, causing early wear and deterioration of the affected elements. The aforementioned problems encountered by bearings in normal environments are greatly multiplied in these extreme, cold environments.

SUMMARY OF THE INVENTION

It is, therefore, one of the principal objects of the present invention to provide a bearing assembly in which the bearing surface is composed of ice, or a frozen fluid material, thus providing a smooth, rigid surface for allowing free movement, and in which the lubrication is provided by a thin film of water or other fluid present between the frozen bearing surface and the supported or rotating member.

Another object of the present invention is to provide an ice bearing assembly having a novel and efficient way of dealing with friction, where present, in that the heat of friction generated between the bearing surface and the supported member will release lubricant from the ice bearing and eliminate the resistance to movement, and which required little, if any, maintenance, making the present invention especially suitable for use in cold environments since lubricant is always available at suitable viscosity for efficient operation, regardless of the ambient temperature.

A further object of the present invention is to provide an ice bearing assembly in which the bearing surface is substantially completely and automatically reformed between periods of use, since the lubricant is reincorporated into the bearing surface, and which, by providing improved support for the supported or rotating member, is capable of wide application and high efficiency in operation.

A still further object of the present invention is to provide an ice bearing assembly which is simple in construction and operation and which provides a long service life through the use of durable, non-corrosive materials.

These and other objects are attained by the present invention which relates to an ice bearing assembly having a supported member designed for movement within the assembly. A centering means, such as a collar mounted on the supported member for rotation therewith, is used to align the supported member during operation of the bearing assembly, and a ring member is disposed around the collar, forming a chamber therebetween. Means are provided for injecting a freezable fluid into the chamber, and additional means are provided for cooling the ring member to a temperature sufficient to cause the fluid to freeze. References herein to water and ice are for the sake of convenience of description, as other freezable fluids may be used in the present invention to form the frozen bearing surface, and reference to ice is intended to include these other freezable substances unless otherwise indicated. During movement of the supported member, the collar slidably engages the surface of the frozen fluid, thereby creating a thin film of lubricant on the frozen surface through the friction created during start-up operations. In one embodiment of the present ice bearing assembly, an alignment means is provided for aligning and supporting the supported member during periods of non-use or while the fluid is in a liquid state before freezing. The present invention finds particular advantages where located in cold regions of Earth or in outer space, as the ambient temperatures there facilitate maintenance of the frozen bearing surface. Overall maintenance is very low, as the lubricant is self-contained and emitted only in the presence of friction, making operation of the present invention efficient and economical.

BRIEF DESCRIPTION OF THE DRAWINGS

FIG. 4 is a fragmentary elevational view of the end opposite that shown in FIG. 3, shown here with the alignment bearings closed, the view being taken from line 4—4 of FIG. 1;

FIG. 5 is a partial, perspective view of the ice bearing assembly embodying the present invention, with a portion of the housing and the bearing surface broken away revealing the arrangement of the internal members;

DETAILED DESCRIPTION OF THE PREFERRED EMBODIMENT

Figure 1:
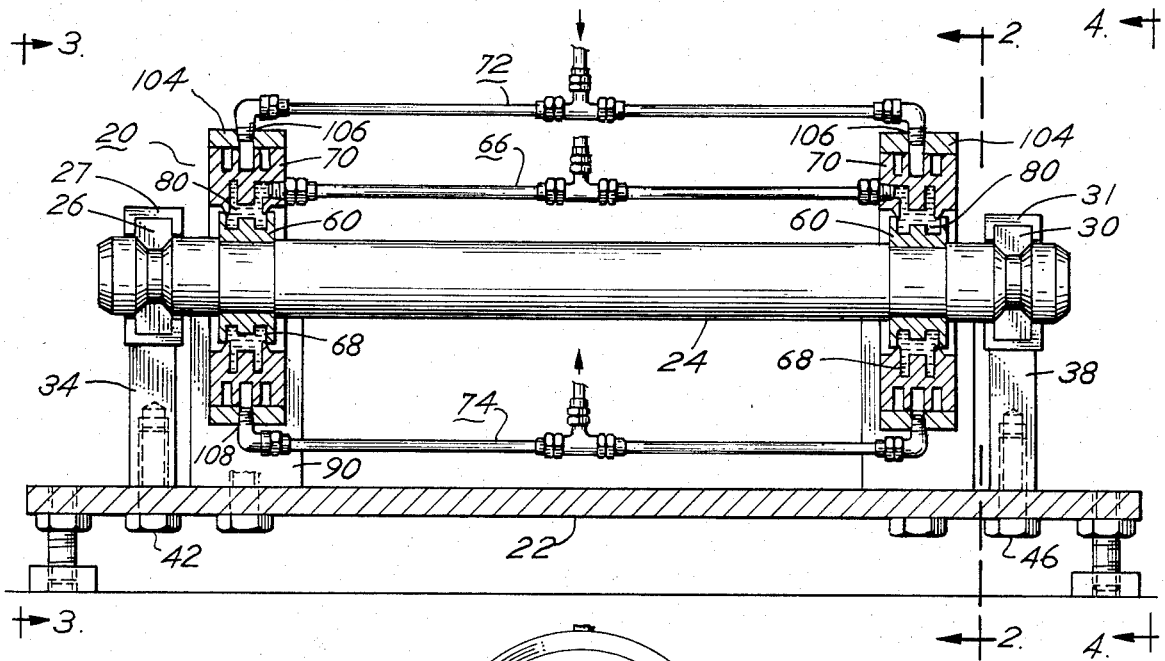
FIG. 1 is a side elevational view, shown partially in cross-section, of the ice bearing assembly embodying the present invention.

Referring more specifically to the drawings, and to FIG. 1 in particular, numeral 20 designates generally the ice bearing assembly embodying the present invention. The assembly 20 has a supporting structure 22 which can be modified, depending on the particular application or machinery involved, the structure 22 serving only as an illustration. A supported member or shaft 24, designed for rotation within the ice bearing assembly, is shown in this embodiment; however, various types of supported members may be used in place of the particular shaft shown, and the motion of the supported member can be rotational or some other form such as, for example, side to side motion, again depending on the particular application and machinery involved. The assembly of the present invention can be adapted in size and in function to a wide variety of conventional bearing assemblies and the following description is not meant to limit the scope of the present invention in any way.

Shaft 24 is aligned and supported before operation of the particular machinery or during periods of non-use by auxiliary or alignment bearing halves 26 and 28 near one end of the shaft and bearing halves 30 and 32 near the opposite end of the shaft, the four halves together comprising right and left alignment assemblies. The bearing halves are mounted on holding members 27, 29, 31, and 33 for halves 26, 28, 30, and 32, respectively. The bearing halves are removably mounted on the holding members using means such as set screws 35, and can be changed to accommodate different sized shafts or other types of supported members. In addition, certain types of supported members may require only one alignment bearing assembly, or may require more than two assemblies, depending on the size and weight of the supported members, and it is intended that all of these variations are covered by the present application.

Figure 3:
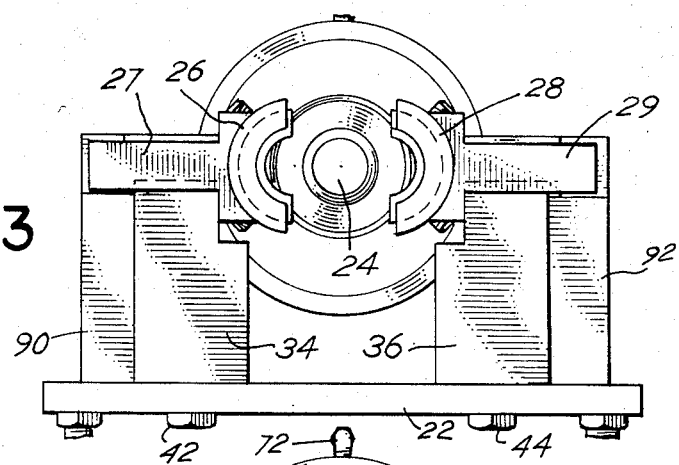
FIG. 3 is an elevational view of one end of the ice bearing assembly shown in the preceding figures, shown here with the alignment bearings open, the view being taken from line 3—3 of FIG. 1.
Figure 2:
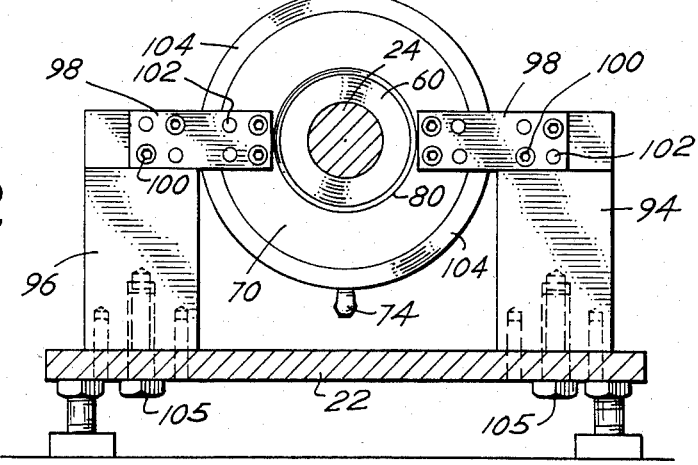
FIG. 2 is a cross-sectional view of the ice bearing assembly shown in the preceding figure, the section being taken on line 2—2 of FIG. 1.
Figure 6:
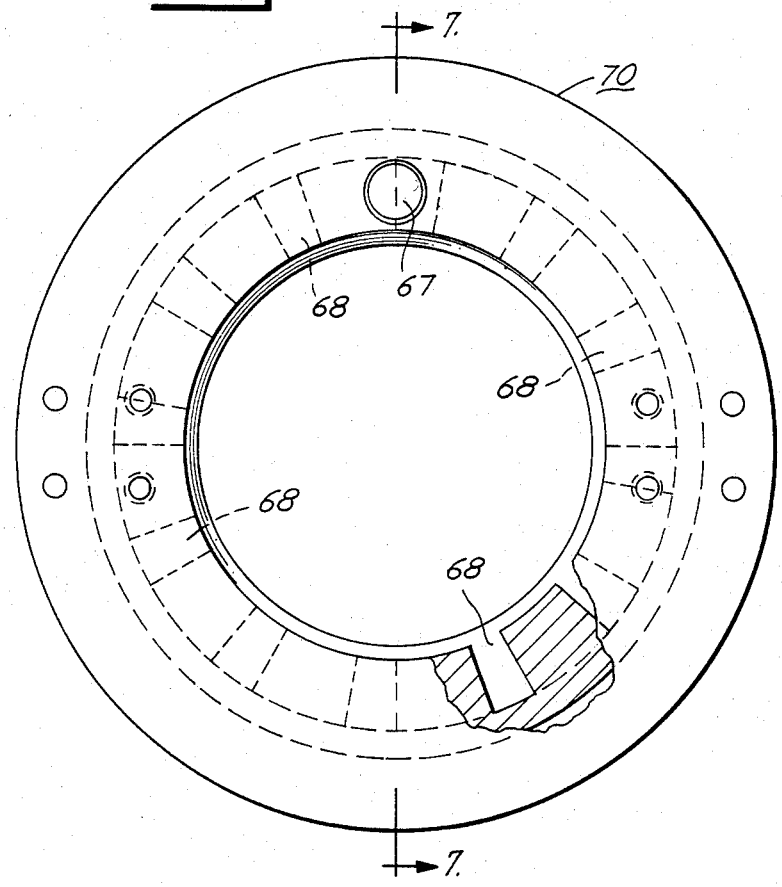
FIG. 6 is an end elevational view of a chill conductor ring used in the present ice bearing assembly, shown partially in cross-section, illustrating the coolant passages.
Figure 7:
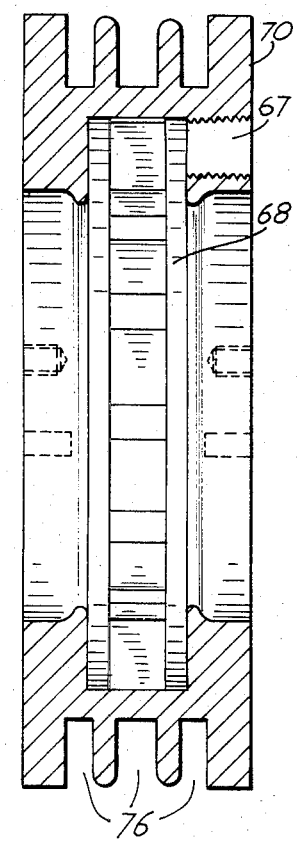
FIG. 7 is a cross-sectional view of the chill conductor ring shown in the preceding figure, the section being taken on line 7—7 of FIG. 6.

The holding members are slidably mounted in tracks on vertically disposed support members, with support members 34 and 36 supporting holding members 27 and 29, respectively, and support members 38 and 40 supporting holding members 31 and 33, respectively, as shown in FIGS. 3, 4, and 5. The support members are secured to support structure 22 using a suitable means such as bolts 42, 44, 46, and 48 for members 34, 36, 38, and 40, respectively. The alignment bearing assemblies have open and closed positions, the open position shown in FIG. 3 and the closed position shown in FIG. 4. A suitable means, such as hydraulic or pneumatic pressure, is used to cause the alignment bearings to open or to close the adjacent halves for supporting and aligning the supported member or shaft before operation. Once the ice bearing surface is formed and operation is ready to proceed, the auxiliary bearings are moved to an open position away from the supported member, as shown in FIG. 3.

Figure 8:
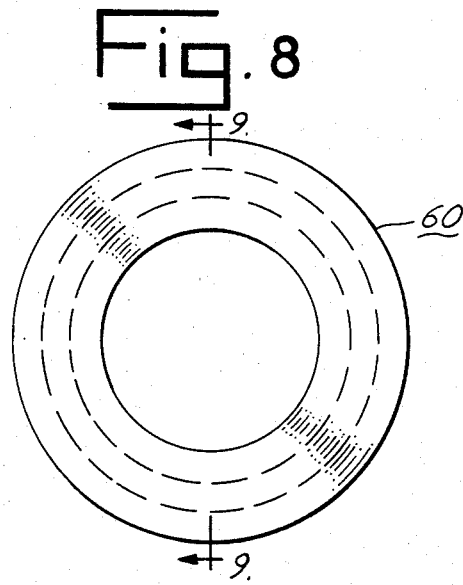
FIG. 8 is an end elevational view of a collar used to support the rotating member in the present invention.
Figure 9:
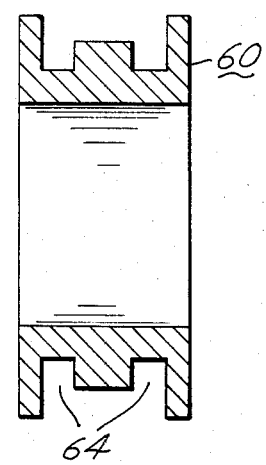
FIG. 9 is a cross-sectional view of the collar shown in the preceding figure, the section being taken on line 9—9 of FIG. 8.

Surrounding shaft 24 are centering means or collars 60, located at the critical support points on the shaft where contact with the ice bearing surfaces is made. The number of critical support points will vary with the length and weight of the supported member, the embodiment shown in FIG. 1 having critical support points at each end of shaft 24. These collars are normally composed of a synthetic resin polymer with a low coefficient of friction, one example of which is the material sold under the trademark Teflon. The collars are pressed onto the shaft and rotate with the shaft as operation of the machinery proceeds. Outwardly facing grooves 64 are formed in the outer surface of the collars to receive the bearing surfaces, the grooves being detailed in FIGS. 8 and 9. As noted earlier, the bearing surfaces are composed of ice. Before operation proceeds, purified water or other suitable, freezable fluid is pumped from supply pipe 66, through fluid ports 67 into a chamber 68, formed by the sealing relationships of the edges of the collars on one side, and the edges of the ring members or chill conductor rings 70 on the opposite side. The water is trapped between the collar and the ring and freezes there as a pressurized coolant is circulated from coolant intake pipe 72, through the chill conductor ring 70, and back to the refrigeration system (not shown) through coolant exhaust pipe 74. The coolant may be a fluorinated hydrocarbon, such as the material sold under the trademark Freon, or it may be material such a liquid nitrogen. The coolant is circulated through passages 76 in the chill conductor ring, the ring being formed of a material which quickly and easily conducts cold, such as aluminum. The ring has recesses 78 formed in its inner surface to increase the surface area of the conductor ring, thereby providing greater contact with the purified water or other fluid material. As the coolant is circulated through passages 76, the ring absorbs and conducts the cold to the water, which freezes into ice, here designated by numeral 80. As shown in FIG. 5, water chamber 68 is formed between collar 60 and ring 70 with the adjacent edges forming a seal to keep the water contained before freezing. As freezing occurs and the ice expands, the adjacent edges of the collar and the ring are separated under the expansion force, thereby allowing free rotation of the supported member or shaft. As rotation occurs, the initial friction created between the collar 60 and the ice bearing surface 80 melts the surface of the ice which contacts the collar, thereby providing lubrication for the rotating collar and shaft. Greater amounts of friction will release more lubricant, such as the water film at the bearing and shaft interface, while lesser amounts of friction will result in a re-forming of the ice bearing surface as the lubricant (the water film) is reincorporated into the bearing surface through freezing. Where properly aligned and adjusted, friction will be minimal. In extremely cold temperatures, very little or no melting at the bearing and shaft interface may occur. Further, in such conditions, as in outer space, no initial or supplemental cooling would normally be required.

Shown extending vertically upwardly from support structure 22 in this embodiment, are four bearing support blocks 90, 92, 94, and 96, secured thereon with suitable fasteners, such as bolts 105. These blocks have transverse mounting plates 98 secured near their upper ends with the opposite ends of plates 98 secured to conductor ring 70. The plates are secured with a plurality of fastening means, such as screws 100, and have been provided with a plurality of holes 102 for accommodating conductor rings and supported members of different sizes. Surrounding the conductor rings are annular sealing and pressure rings 104, which seal the outside of the conductor rings, thereby keeping the pressurized coolant contained therein. The coolant is supplied through ports 106 near the upper surfaces of the pressure rings and returned to the refrigeration system (not shown) through ports 108 near the lower surface of the pressure rings.

Figure 10:
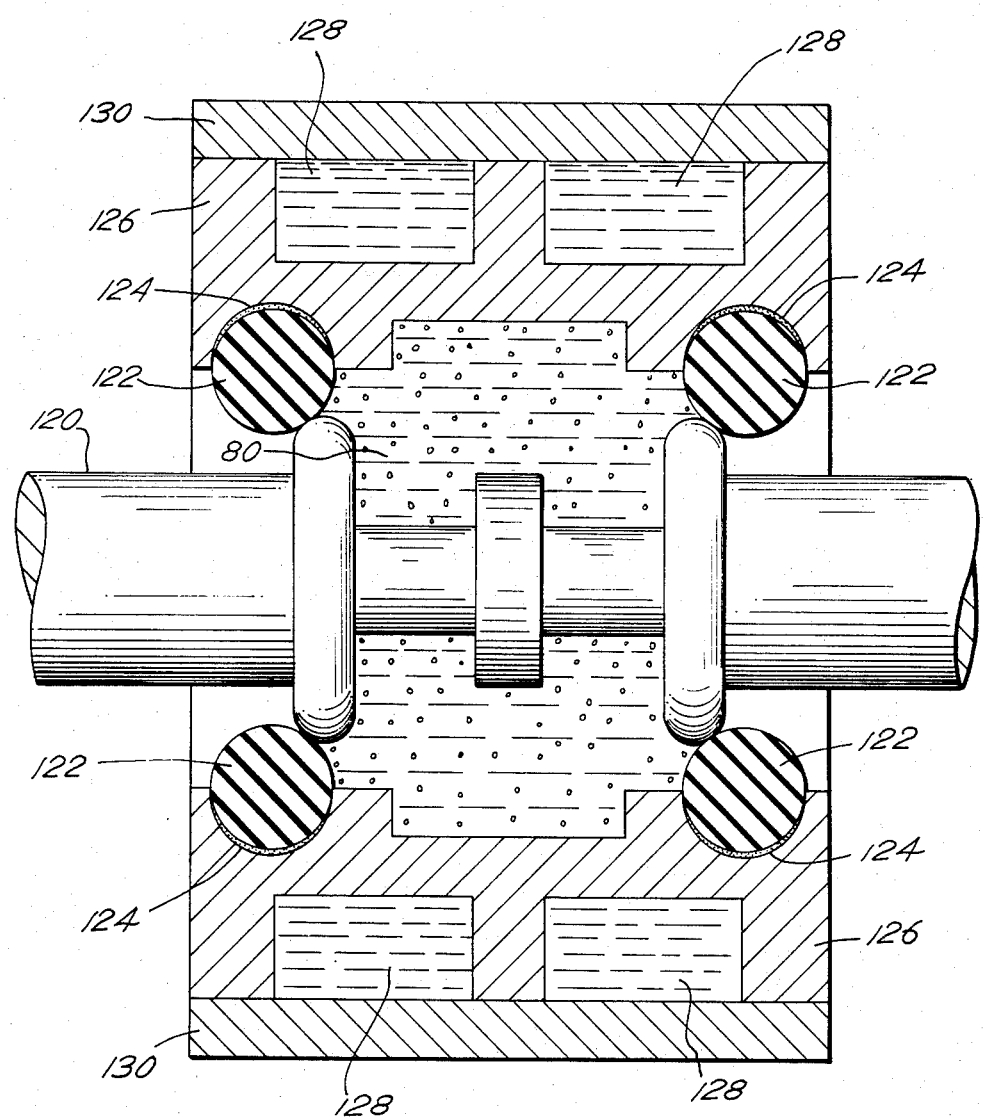
FIG. 10 is a partial, side elevational view, shown partially in cross-section, of an alternate embodiment of the present ice bearing assembly.

An alternate embodiment of the present ice bearing assembly is shown in FIG. 10. In this embodiment, shaft 120 is aligned as described above, using the alignment bearing assemblies, the assemblies being operational during periods of non-use and prior to operation of the shaft, while the water is being pumped in and frozen. In this embodiment, sealing means, such as the O-rings 122 shown here, composed of a suitable material such as rubber and secured at points 124 in a suitable manner, as by gluing, are disposed between a ring member or chill conductor ring 126 and a supported member or shaft 120. Conductor ring 126 has coolant passages 128 formed in its outer surface and a sealing or pressure ring 130 disposed around the outer surface for containing the coolant material. Purified water is pumped into the chamber formed between the coolant ring, the rubber seals, and the shaft, where it is frozen into ice 80 upon circulation of the coolant. As the ice freezes and expands, seals 122 are forced away from the shaft, thereby allowing free rotation against the ice bearing surface.

In the use and operation of the ice bearing assembly embodying the present invention, the alignment bearing assemblies with bearing halves 26, 28, 30, and 32 are activated to support and align the shaft 24 during periods of non-use or whenever the contents of the freezing chamber 68 are in a liquid state. Once the alignment bearings are in position, purified water or other suitable fluid is pumped from supply pipe 66 into chamber 68, formed between the adjacent edges of the chill conductor ring 70 and the collar 60. When the chamber is full, a coolant such as liquid nitrogen or material sold under the trademark Freon, is circulated from coolant intake pipe 72, through the passages 76 in chill conductor ring 70, to coolant exhaust pipe 74, and back through the refrigeration system (not shown). The conductor ring, composed of an efficient cold conducting material such as aluminum, conducts the cold to the water, which then freezes. As the water freezes and expands, the conductor ring 70 is forced away from its sealing engagement with collar 60, thereby allowing free rotation of shaft 24 and collar 60, which is secured to the shaft. When the water is completely frozen, the alignment bearings are deactivated and moved to open position, away from shaft 24.

As rotation of the shaft begins, the friction created melts the surface of the ice 80 which contacts collar 60, thereby providing lubrication for the rotation collar and shaft. Under extreme conditions, greater amounts of friction will result in more lubricant being released, while lesser amounts of friction will result in a re-forming of the ice bearing surface; thus, a novel and efficient method of dealing with friction has been designed into the present invention in terms of the operation of the bearing assembly and of the materials used for the bearing surface and the collar. In addition, since the problem of friction is almost immediately alleviated, there is normally no substantial deterioration of the ice bearing surface. The operation of the ice bearing assembly is monitored by a central control system (not shown), which controls the amount of water and coolant which is circulated through the assemblies, continuously monitors the shaft alignment through a suitable system, such as a laser alignment system, and controls the alignment bearings to support the shaft or other member when the contents of chamber 68 are in a liquid state.

The ice bearing assembly described herein will find particular advantage in outer space applications or in cold regions of Earth. In these and similar cases, the ice bearing must be formed in a warmer vicinity to prevent freezing of the bearing material within the storage means, pipes, or pumps, before operation. In case of an inadvertent thaw, the ice bearing surfaces are easily and quickly re-formed using the refrigeration system. Heating coils may be provided if thawing is required, and shutters may be provided to protect the ice bearing from the sun's heat and radiation where the assembly is in outer space. Location of the ice bearing in a cold region will reduce the operating time of the refrigeration system, saving the cost of operation where the refrigeration system is used only as a back-up, and is not needed to maintain the cold during operation. Proper insulation in warmer regions will provide efficient operation, and the overall maintenance required by the present invention is minimal.

While one embodiment of an ice bearing assembly, and a modification thereof, has been shown and described in detail herein, various other changes and modifications may be made without departing from the scope of the present invention.

I claim:

1. An ice bearing assembly having a rotatably supported member for rotation in the assembly, said assembly comprising at least one centering means disposed around said supported member and at least one ring member disposed around said centering means and defining a chamber therebetween, a means for injecting a freezable fluid into said chamber for freezing therein, a means for cooling said ring member to a temperature sufficient to cause freezing of said fluid, whereby said centering means slidably engages said frozen fluid during rotation of the supported member, and alignment bearing assemblies for said supported member, having open and closed positions and being spaced apart along the axis of said supported member, said closed position for aligning and supporting the supported member before injection of said fluid into said chamber and before said fluid has frozen, and said open position for allowing free movement of the supported member.

2. An ice bearing assembly as defined in claim 1 in which said centering means includes at least one collar mounted on the supported member for rotation therewith and one of said collars and one of said ring members are disposed at critical support points of the supported member for providing a bearing surface at said support points.

3. An ice bearing assembly as defined in claim 1 in which said ring member is composed of aluminum and has coolant passages therein for receiving and allowing circulation of a coolant material.

4. An ice bearing assembly as defined in claim 1 in which said means for cooling said ring member includes a refrigeration system for circulating a coolant material.

5. An ice bearing assembly as defined in claim 4 in which said ring member includes a chill conductor ring composed of aluminum and having a passage formed in the outer surface thereof for receiving said coolant material.

6. An ice bearing assembly as defined in claim 5 in which said collar is composed of a synthetic resin polymer having a low coefficient of friction and said collar has grooves formed in its outer surface for receiving said freezable fluid.

7. An ice bearing assembly as defined in claim 6 in which said assembly includes support blocks having one end of a mounting plate removably secured to said blocks, and said mounting plate has an opposite end removably secured to said ring member for mounting said ring member.

8. An ice bearing assembly as defined in claim 7 in which said alignment bearing assemblies include lower members secured to a supporting structure and upper members slidably mounted on said lower members, and a means for moving said upper members between open and closed positions for selectively engaging the supported member.

9. An ice bearing assembly having a supported member designed for movement within said assembly, comprising at least one member disposed around the supported member and defining a chamber therebetween for receiving a freezable fluid material, said member including a chill conductor ring having passages therein for receiving and allowing circulation of a coolant material for lowering the temperature of said ring to a temperature sufficient to freeze said fluid material, a means for freezing said fluid within said chamber for forming a bearing surface, and sealing means for preventing the escape of said fluid before freezing is accomplished, said assembly including alignment bearing assemblies having open and closed positions and being located near support points of the supported member, said closed position for aligning and supporting the supported member before injection of said fluid into said chamber and before said fluid has frozen, and said open position for allowing free movement of the supported member.

10. An ice bearing assembly as defined in claim 9 in which said means for freezing said fluid includes a refrigeration system operatively connected to said passages in said ring.

11. An ice bearing assembly as defined in claim 10 in which said sealing means includes elastomeric O-rings disposed between said ring and the supported member for containing said fluid material.

12. An ice bearing assembly as defined in claim 11 in which said alignment bearing assemblies include lower members secured to a supported structure and upper members slidably mounted on said lower members, and a means for moving said upper members between open and closed positions for selectively engaging the supported member.

13. In an ice bearing assembly having a supported member designed for movement within the assembly and a means for moving the supported member, said assembly comprising a collar mounted on the supported member at critical support points for movement therewith and for centering the supported member and a ring member disposed around said collar and forming a chamber therebetween for receiving a fluid material, said ring member being composed of aluminum for conducting cold and having a passage therein for receiving a coolant material, said passage formed in the outer surface of said ring member, and said ring member including recesses formed in the inner surface thereof for receiving said fluid material, a means for injecting said fluid material into said chamber, a means for freezing said fluid within said chamber for forming a bearing surface against which said collar moves, and an alignment assembly for aligning and supporting the supported members before freezing of said fluid, including lower members secured to a supporting structure and upper members slidably mounted on said lower members, and a means for moving said upper members between open and closed positions for selectively engaging the supported member.

14. In an ice bearing assembly as defined in claim 13, said collar is composed of a synthetic resin polymer and has grooves formed in the outer surface thereof for receiving said fluid material.

* * * * *